INVENTORS
JOHN HARDUK
ROLAND LESSIG
BY
Carl Fissell Jr
AGENT

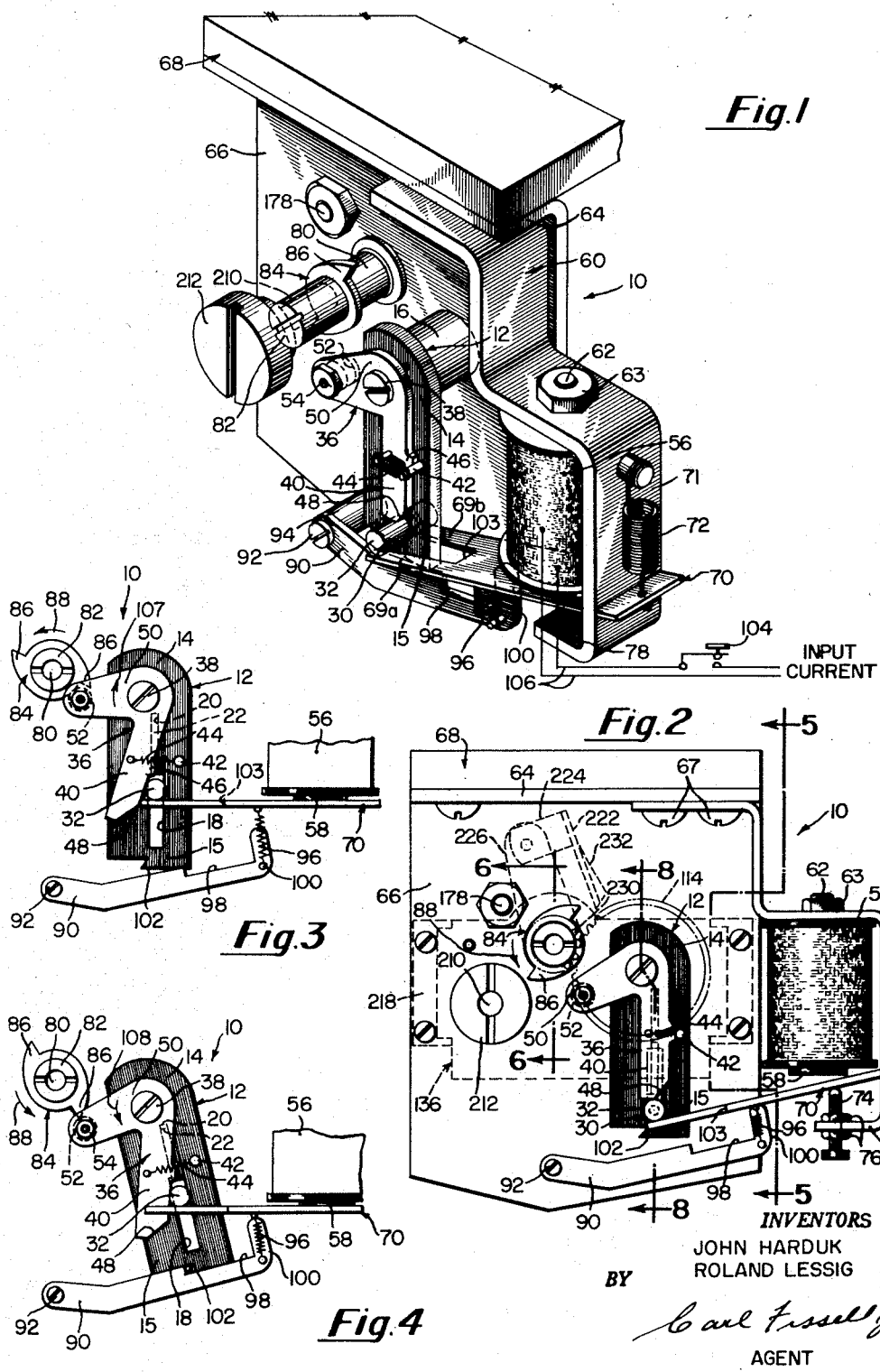

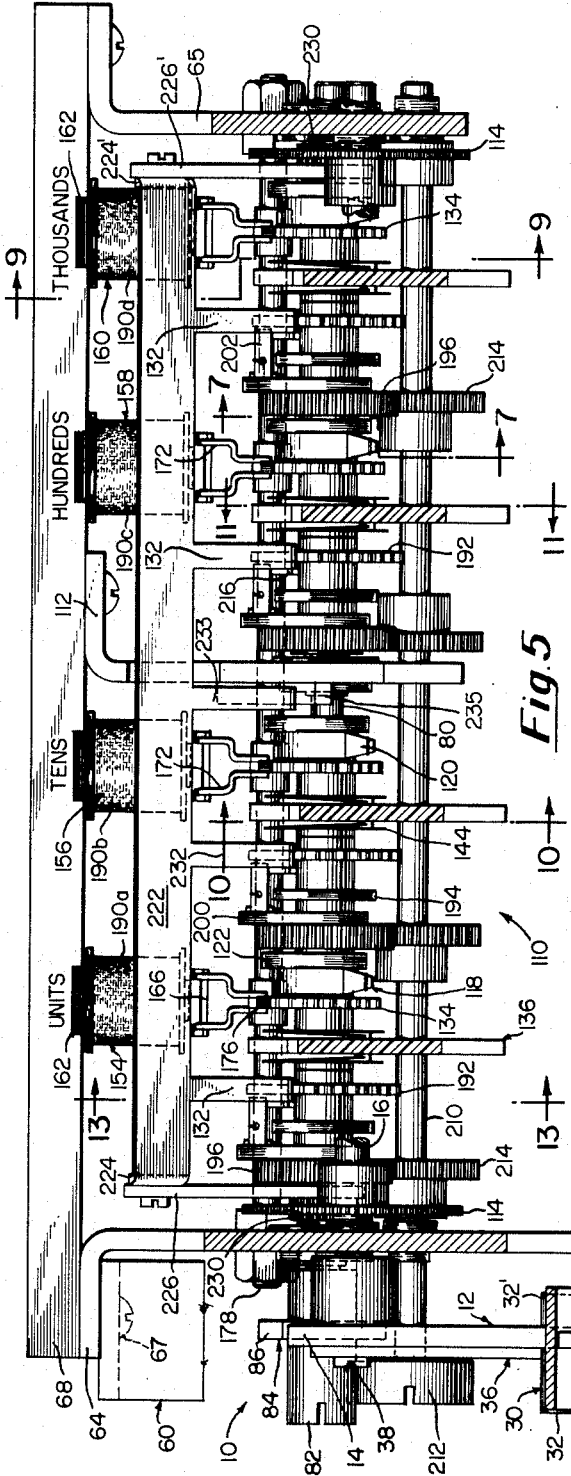
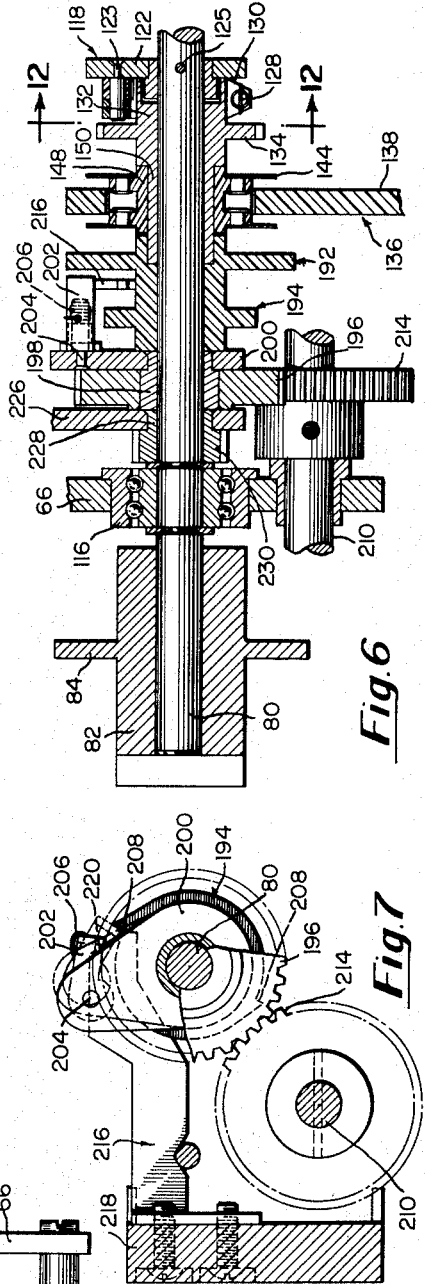
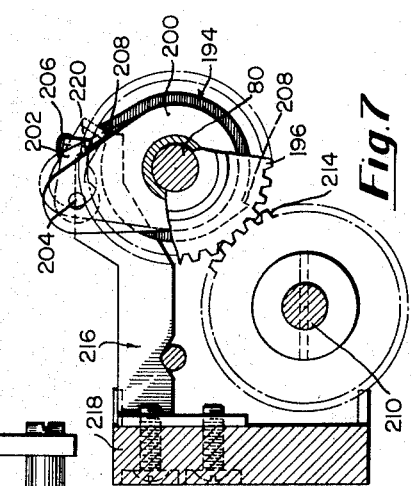
Fig.5
Fig.6
Fig.7
INVENTORS
JOHN HARDUK
ROLAND LESSIG
BY
AGENT Jan. 30, 1962  J. HARDUK ETAL  3,019,316
INTERMITTENT MOTION APPARATUS
Filed Jan. 18, 1960  4 Sheets-Sheet 3

Jan. 30, 1962  J. HARDUK ETAL  3,019,316
INTERMITTENT MOTION APPARATUS
Filed Jan. 18, 1960  4 Sheets-Sheet 4

INVENTORS
JOHN HARDUK
ROLAND LESSIG
BY
Carl Fissell Jr
AGENT

United States Patent Office 3,019,316
Patented Jan. 30, 1962

3,019,316
INTERMITTENT MOTION APPARATUS
John Harduk, Haddon Heights, N.J., and Roland Lessig, Philadelphia, Pa., assignors to Burroughs Corporation, Detroit, Mich., a corporation of Michigan
Filed Jan. 18, 1960, Ser. No. 3,044
12 Claims. (Cl. 200—105)

This invention relates to intermittent motion apparatus and more particularly to control means for effecting operation of a stepping device.

Still more specifically the invention has to do with apparatus for reversing the stepping movement of a stepping switch mechanism, such as an item counting device in a calculating or accounting machine, thus to effect subtracting operations.

It is an important object of this invention to provide selectively operable intermittent motion apparatus.

It is also an object of the present invention to provide novel apparatus for deriving intermittent oscillatory motion from a continuously rotatable member.

It is another object of the present invention to provide apparatus for effectively oscillating a pivotally mounted member through a fixed angle on demand.

Another object of the invention is to provide a reliably operating intermittent motion apparatus usable in continuous, single or multiple cycles.

More specifically, it is an object of the invention to provide apparatus for reversing the stepping movement of an item counting device of an accounting machine.

In accordance with the foregoing objects and first briefly described herein, the present invention comprises a rotatable cam and means for coupling the cam to a source of torque. A rockable member is disposed adjacent the cam and is operably engageable therewith. A pivotally mounted member is disposed adjacent the rockable member and includes means for rocking the rockable member in one direction into the path of movement of the rotatable cam whereby the cam is effective to rock the rockable member in the opposite direction. Means is provided for coupling the rockable member to the pivotally mounted member whereby the latter is rocked about its pivotal mounting during movement of the rockable member in the opposite direction.

The novel features which are considered characteristic of the invention are set forth with particularity in the appended claims, but for a better understanding of the invention itself, both as to its organization and method of operation together with other and further objects and advantages thereof, reference will be had to the following description of a preferred embodiment shown merely for illustration taken in conjunction with the accompanying drawings, in which:

FIG. 1 is an isometric view of a control apparatus in accordance with the present invention;

FIG. 2 is a front elevational view of the invention;

FIG. 3 is a view of the compound lever of the present invention shown in its cocked position;

FIG. 4 is a view of the present invention showing the compound lever in its latched condition;

FIG. 5 is a sectional view taken along the line 5—5 of FIG. 2 and further illustrating the invention in use with an accounting machine;

FIG. 6 is an enlarged detail view along the line 6—6 of FIG. 2;

FIG. 7 is a view along the line 7—7 of FIG. 5;

Figure 10:
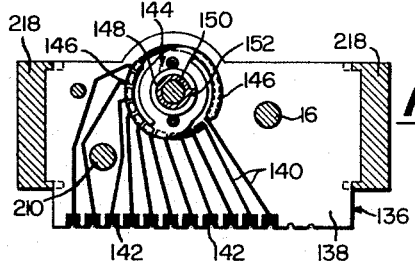
Figure 11:
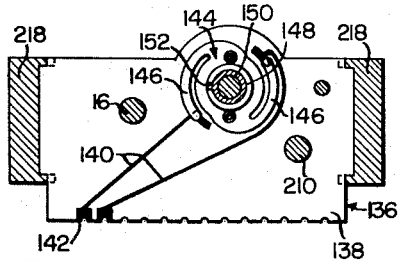
Figure 12:
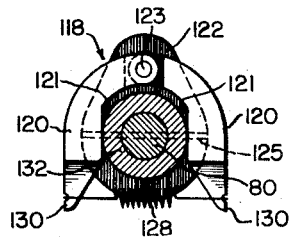
Figure 13:
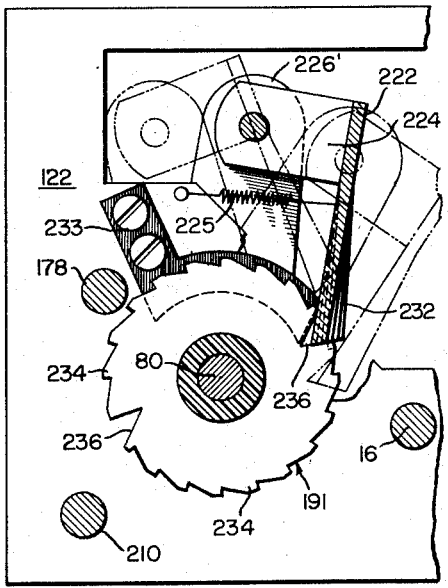

FIGS. 10 and 11 are views along the line 10—10 and 11—11 respectively, of FIG. 5, and illustrate the obverse and reverse sides of etched circuit members incorporated in the apparatus of the present invention;

FIG. 12 is a sectional view along the line 12—12 of FIG. 6;

FIG. 13 is a view along the line 13—13 of FIG. 5; and

FIGS. 14, 15, 16 and 17 are sequence views illustrating the subtraction operation of the present invention.

According to the present invention and as will be described in detail hereinafter there is provided a compound lever fixedly mounted at one end thereof on a rotatable shaft. The lever is provided with a dumbbell shaped cam follower slidable in a slot in the opposite end thereof. The cam follower is resiliently biased outwardly from the slot away from the shaft and is controlled by the bifurcated elongation of the clapper of an electromagnet. A bell crank is rotatably mounted on the same shaft with the slotted lever and includes a first arm which extends generally in the same direction as the lever and is resiliently urged against a pin mounted therein. A second arm of the bell crank extends outwardly at an angle from the first arm and is provided with a rotatable cam follower mounted near its extremity. A portion of one end of the first arm is cut away to form a cam surface cooperating with the dumbell cam follower. The rotatable cam follower lies, in its normal position, in the same plane as but outside the path of movement of a continuously rotating radial cam. Energization of the electromagnet mounted adjacent the slotted lever activates the clapper urging the dumbbell cam follower against the cam surface of the first arm of the bell crank causing the cam follower to ride down the cam surface and behind the first arm thereby effectively locking the first lever and the bell crank in different relative angular positions such that the cam lobe of the continuously rotating cam rocks the bell crank in a reverse direction thereby rocking the lever and the shaft carrying the slotted lever.

A stepping mechanism operable as an item counting device is operatively associated with the control apparatus and is provided with means actuated by the slotted lever and responsive to rocking movement of the later to move the stepping mechanism in a direction opposite to that in which it is normally moved. A latch is provided for the apparatus such that the lever and bell crank are disposed in a fixed position as long as the electromagnet is continuously energized thereby assuring that the shaft carrying the slotted lever will be rocked only once for a single activation of the electromagnet.

The preferred and illustrated embodiment of the present invention, as seen in FIG. 1, comprises electromagnetically actuated control apparatus 10 wherein an elongated compound rockable actuating lever 12 is secured at one end 14 to and movable with a rock shaft 16 whereby its opposite depending end 15 is permitted to move arcuately about shaft 16, as will be described hereinafter.

Figure 8:
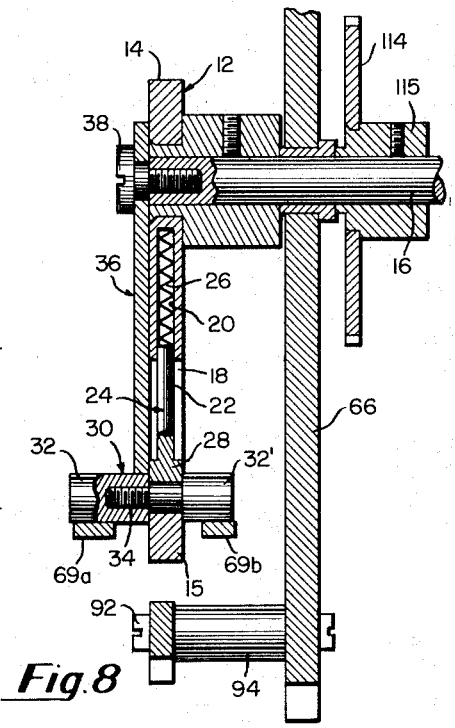
FIG. 8 is a view along the line 8—8 of FIG. 2.

As seen most clearly in FIG. 8, lever 12 is provided with an elongated radially extending opening or slot 18 adjacent the free end 15 thereof. Opening inwardly from the base of the slot 18 is a hollow cylindrical chamber or receptacle 20 into which the elongated shank 22 of a substantially T-shaped plunger member 24 is slidably receivable. Plunger 24 is biased outwardly from the chamber 20 by means of a coil spring 26 positioned therein. The horizontal cross arm portion 28 of plunger 24 is urged by spring 26 into contact with a two piece dumbbell shaped cam followed 30 (FIG. 8), the opposite ends 32—32' of which are threaded together through the slot 18, as shown at 34. The plunger 24, and thus the follower 30, are in this manner slidably movable longitudinally of lever 12 within the slot 18 such that the cam follower 30 is normally biased outwardly in a direction away from the rock shaft 16.

Referring to FIG. 1, a bell crank 36 of generally V-shaped configuration is pivotally mounted for rocking movement on shaft 16 by means of a bolt 38 threaded into the end of the shaft. In the rest or non-operated condition of the apparatus one arm 40 of bell crank 36 extends substantially parallel to the long dimension of the lever 12 and is resiliently urged against a pin 42 on the lever by means of a spring 44. A small protuberance in the nature of a limit or stop member 46 is formed in one edge portion of the arm 40 for aligning the arm with the lever 12. An edge portion of the end of arm 40 is angularly cut away to form a sloping cam surface 48, FIGS. 1–4, engageable with the end 32 of the dumbbell shaped follower 30. The other arm 50 of bell crank 36 extends angularly outwardly away from the arm 40, as shown in FIG. 1, and carries at its outer extremity a cam follower roller 52 rotatably mounted thereon in a suitable manner, as by a bolt 54.

Actuating means for the present invention is provided through a relay type electromagnet 56, including a magnetizable pole piece or core member 58, FIGS. 2, 3 and 4, which is mounted adjacent the shaft 16 on a horizontal portion of an irregularly shaped bracket or strap 60, as by bolt 62 and nut 63. Bracket 60 is secured to a flange 64 of a support plate or wall member 66, by means of bolts 67, FIG. 2. Support plate 66 may be attached by the same bolts 67 to an elongated rectangular member 68 which, as will be described hereinafter, supports the complete assembly, as shown in FIG. 5. The dumbbell cam follower 30 is engaged and actuated by means of the parallel projecting ends 69a—69b of the bifurcated end of the solenoid clapper 70 rockably pivoted in a slot, not shown, in the upstanding portion 71 of the supporting bracket 60. The ends 69a—69b of the clapper 70 thus are seen to straddle the end 15 of lever 12 and the follower 30. A spring 72 urges the clapper away from the core 58, FIG. 2, of the electromagnet. The air gap thus formed between the clapper and core may be adjustably varied by means of the bolt 74 and nuts 76 disposed on the bent over tab 78 of the strap member 60

A shaft 80, adapted to be continuously rotated from a source of constant torque, not shown, through coupling member 82, is provided with a cam 84 having two oppositely disposed complementary cam lobes 86—86 thereon. The shaft 80 is rotatable in the direction of the arrows 88, FIGS. 2, 3 and 4, such that a rising cam surface of each lobe is adapted to contact the follower roller 52 of bell crank 36, as will be explained presently.

In its rest position (FIG. 2) bell crank 36 is normally disposed out of the path of movement of the two cam lobes so that cam 84 is free to rotate without interference therefrom. In order to effect a controlled rocking movement of shaft 16 means is provided for moving the bell crank 36 in a direction to bring arm 50 carrying roller 52 into the path of movement of the lobes 86—86, as will be described hereinafter.

Means is also provided for temporarily latching bell crank 36 in a position out of engagement with cam lobes 86—86 and comprises an elongated substantially L-shaped arm 90 pivoted at one end to the support plate 66 by means of the bolt 92 and spacer bushing 94. The opposite end of arm 90 is biased toward clapper 70 by means of a spring 96 attached at one end to the clapper and at the other end to the arm 90. The clapper 70 thus tends to drag the arm 90 with it as it is attracted to the core 58 when the electromagnet is energized. The longer, substantially straight portion of the arm 90 is provided with a notch 98 adjacent an upstanding leg portion 100 thereof. A projection or tab 102 on the end portion 15 of the slotted lever 12 is receivable within and seats in the notch 98, in a manner hereinafter described.

Referring to FIG. 1, when it is desired to rock shaft 16 in a counterclockwise direction, for purposes to be described later on, push button switch 104 is closed energizing electromagnet 56 over the conductive leads 106 from a source of electrical energy, not shown, pulling in clapper 70 and drawing lever 90 toward lever 12. This rocking movement of clapper 70 urges the dumbbell cam follower 30 against the cam surface 48 of bell crank arm 40 causing the follower to ride along arm 40 toward the end of the opening or slot 18 forcing bell crank 36 to rotate leftwardly in a clockwise direction, arrow 107, against the tension of spring 44 and in a manner tending effectively to lock the bell crank and lever together momentarily. Arm 50 carrying roller 52 is in this manner urged into the path of movement of continually rotating cam 84. The two members 12 and 36 thus locked together behave as a single lever. Continued rotation of shaft 80 causes a cam lobe 86 to engage cam follower 52 rocking the bell crank 36 and lever 12 to the right as seen in FIG. 4, in the direction of the arrow 108, until the lever 12 limits against the inner edge 103 of clapper 70 in which position projection 102 of lever 12 moves into the notch 98 in the latching lever 90 thereby momentarily latching the bell crank in its cocked position, FIG. 4, out of the path of the rotating cam 86. Shaft 16 is thus rocked about its own axis for a purpose to be explained hereinafter.

De-energization of solenoid 56, as by opening switch 104, permits clapper 70 under force of spring 72 aided by spring 96 to move away from core 58 moving the arm 90 out of engagement with lever 12 permitting the spring 26 to urge the follower 30 upwardly along the edge of arm 40 until the latter is pulled by spring 44 in a direction to engage the stop member 46 with pin 42 returning the bell crank 36 and lever 12 to their respective non-operated positions. In this manner the apparatus of the present invention is deactivated and placed in a neutral or rest position returning shaft 16 to the position shown in FIG. 1. It should be noted that the foregoing novel construction eliminates any wear on the follower 52 in either the rest or the cocked position of the bell crank since the structural configuration and operation of the apparatus maintains the follower out of contact with the lobes of the operating cam 84.

Referring now to FIG. 5 which is an elevational view, partially in section, there is illustrated one form of utilization device employing the control apparatus of the present invention. The apparatus therein illustrated comprises a subtraction mechanism 110 for an automatic business machine. Such apparatus is useful as a means for enabling the machine operator to correct errors e.g., wrong amounts, indexed into the machine automatically or inadvertently by the operator. The various sub-assemblies of this mechanism are carried on a plurality of shafts which are journalled in bearings press-fitted or otherwise mounted in frame members 65 and 66 and the intermediate member 112.

The shaft 16, earlier referred to, extends lengthwise of the mechanism 110 and is provided with toothed gears 114 and 114' press-fitted to bushings 115 (FIG. 8) and the bushings are secured to the shaft at opposite respective ends thereof as by set screws for rocking movement with the shaft for purposes to be explained presently.

Shaft 80, likewise extends the length of the assembly 110 and is journalled, as by bearings 116, in members 65 and 66 and carries a number of sub-assemblies which, as seen in FIGS. 5 and 6, are spaced apart therealong in a manner now to be described.

Secured to shaft 80, at intervals therealong are individual friction couplings 118 substantially similar to the friction coupling described and claimed in a Patent No. 2,906,838 to W. W. Deighton and assigned to the same assignee as the present invention. One such coupling is shown partially in section in FIG. 12 and includes a pair of clutch arms 120—120 which conform in part to the curvature of shaft 80 and extend around opposite portions thereof. The clutch arms are pivoted together on a carrier member 122 by means of a laterally projecting stud 123. The member 122 is attached to shaft 80 by means of the pin 125. The opposite ends of the clutch arms are yieldingly drawn toward one another by a spring 128 attached at its ends to the projections 130—130 on the clutch arms. The spring 128 biases the arms toward an enlarged hub 132 forming an integral part of individual escapement wheels 134, FIG. 6, one of which is rotatably mounted on shaft 80 adjacent each coupling 118. The spring urges the flats 121—121 of each of the arms into frictional engagement with the hub 132. The two clutch arms thus surround and grip the hub 132 and provide selective rotation of each ratchet wheel 134, at desired intervals, as will be explained presently.

Located along the shaft 80 adjacent and parallel to each escapement wheel 134 is a distributor mechanism 136. In the illustrated embodiment of the invention, as shown in FIGS. 10 and 11, this mechanism comprises a printed wiring or etched circuit member 138 of thin, flat planar dielectric material bearing exposed conductive wiring busses 140 and terminal pads 142, FIGS. 10 and 11, on opposite respective sides thereof, and includes a pair of oppositely disposed rotatable terminal and buss contacting wiper assemblies 144. Each wiper assembly is provided with a pair of arcuately shaped electrically conductive arms 146, which as shown in FIGS. 10 and 11, are located on diametrically opposite sides of each planar member 138 and have their centers of curvature coinciding with the axis of the shaft 80. Each wiper assembly is carried on an annular member or collar 148 of any well known dielectric material and may be press-fitted thereto in a known manner. Each collar 148 is secured for conjoint rotation to an under cut hub 150 integral with and extending axially from the escapement ratchet wheel 134 as by being keyed thereto, as indicated by reference character 152.

Figure 9:
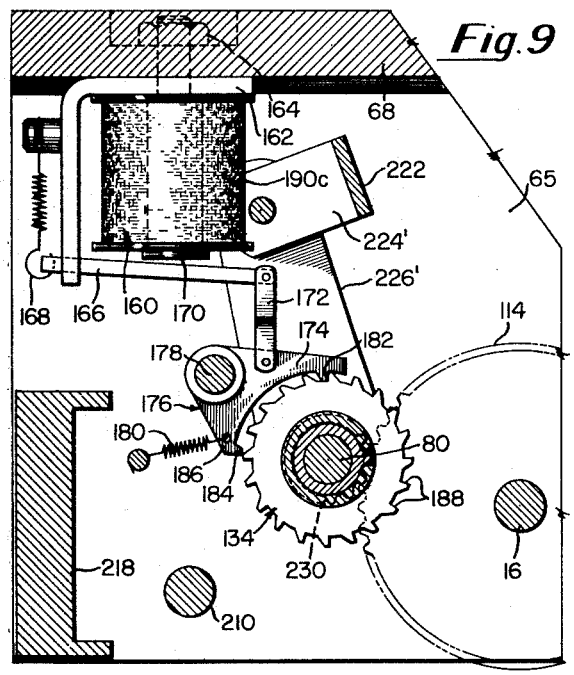
FIG. 9 is a view along the line 9—9 of FIG. 5.

Referring to FIG. 5, as a means for rotatively indexing each rotor wiper assembly 144 over the busses 140 of the respective etched circuit members 138, four electromagnets 154, 156, 158 and 160 are provided. Each electromagnet is mounted by means of an individual bracket 162 which may be bolted, as indicated at 164 (FIG. 9) or press fitted or otherwise attached to the supporting member 68 extending the length of the apparatus. As seen most clearly in FIG. 9, the brackets 162 are substantially L-shaped thus to provide a pivotal mounting for the clapper-armature 166, biased away from the pole piece 170 of the electromagnet with which it is associated by a spring 168 secured at one end thereof. The opposite end of each clapper is pivotally secured to opposite arms of a yoke shaped linkage 172 operatively connected to the longer arm 174 of an escapement pawl 176. There being one escapement 176 for each gear wheel 134, as seen in FIG. 5. Each escapement 176 is rockably mounted on a shaft 178 extending transversely of the apparatus adjacent wheels 134, and is biased by a spring 180 so that the projection or click 182 of the longer arm 174 is normally engaged with one of the teeth of the wheel 134 while the click 184 of the shorter escapement arm 186 is held away from the path of movement of the escapement wheel teeth. The leading edge of the teeth of wheel 134 are profiled to match the leading edge of the clicks 182—184 when the wheel is rotated in a counterclockwise direction, while the trailing edges of the escape wheel teeth are cut at an angle to permit the teeth to escape over the clicks when the wheel is driven in the reverse direction.

Since shaft 80 is constantly rotating, being driven from an external source of torque, as before mentioned, it is seen that energization of any one or more or all of the windings 190a, b, c and d of the electromagnets 154, 156, 158 and 160 will actuate the respective escapements 176 permitting each wheel 134, through its respective slip clutch 118 to rotatively step or advance one tooth at a time for each pulse or energization of the respective winding. Since each rotor wiper assembly 144 of the respective etched circuit assembly 138 is carried on a hub 150 integral with a respective escape wheel 134, each time a wheel is stepped or advanced the respective rotor wiper arms 146 will be positioned at a buss 140 corresponding to the number or digit represented by the number of pulses applied to the winding.

Referring to FIGS. 5 and 6, and more particularly to FIG. 6, adjacent each wiper assembly 144 and keyed to the escape wheel hub 150 is an integral assembly comprising a subtract gear 192 and a two lobed reversing and/or zeroizing cam 194, the operation of which will be described presently.

A reverse driving mechanism for the hereinbefore referred to utilization device is seen in FIGS. 6 and 7 to comprise a toothed gear 196 press-fitted to a bushing 198 rotatable on shaft 80 and includes a support member 200 also press-fitted to bushing 198. Support member 200 carries a flat, substantially L-shaped cam follower member 202 pivotally mounted by means of a pin 204 to the end thereof and biased by means of a spring 206 in a direction to engage the complementary lobes 208—208, FIG. 7, of the reversing cam member 194.

An input power drive for the reversing mechanism includes a shaft 210 supported and journalled between end walls 65 and 66 and the intermediate wall member 112. Shaft 210, driven from a source of torque, not shown, through coupling 212 carries a plurality of gear wheels 214 spaced apart therealong and pinned thereto for conjoint rotative movement. Each gear wheel 214 meshes with a respective one of the gears 196 of the reverse mechanism hereinabove referred to. Rotation of shaft 210 through coupling 212 thus will rotate gears 214 in a direction to drive the reverse gears 192 backwardly with respect to the direction of rotation of wheels 134 to reversely rotate the wiper arms 146 resetting the latter to the desired positions with respect to the printed circuit members 138. In order to prevent interference between the reverse cam follower 202 and lobes 208 of the cam 194 when operation of the reversing mechanism is not called for, a retracting cam member 216, shown most clearly in FIG. 7, is provided for each wheel 196. Each cam member 216 is attached in a suitable manner, as by bolts, to the frame 218 extending between wall members 65—66, FIG. 7. A sloping cam surface 220 on each member 216 is engageable with the cam follower 202 to retract the latter against the tension of spring 206 from the full line to the dotted line position, out of the path of movement of the lobes 208.

As earlier pointed out herein, the present invention may be employed in a business machine, calculator, etc., to provide means for correcting erroneously entered numerical information, such for example, as a number which has been incorrectly posted to an account or a number, the digits of which have been transposed, etc.

In the subtracting mode of operation, as distinguished from the reversing mode, earlier referred to, means is provided for counting i.e., rotatively indexing backwardly from the least significant digit to the most significant digit.

If for example, the numerical entry to have been stored in the apparatus herein described was the number 0299 then the first solenoid 154 should have received nine pulses, the second solenoid 156 should have received nine pulses, the third solenoid 158 should have received two pulses, and the fourth solenoid should have received no pulses.

The means for providing the subtracting mode of operation includes the backup or subtract gear wheels 192 earlier referred to, which are or may be integral with the reverse cams 194 keyed to the hubs 150 of the digital indexing apparatus, before described. As seen in FIG. 5, four such wheels 192 are employed in the illustrated embodiment but it is to be understood that any number of subtract wheels could be employed within the purview of the invention. The number used results from practical requirements of the business machine with which the invention is associated and the total amounts which it is desired to be able to subtract. The present construction permits subtracting of amounts from four columns of digits.

As seen most clearly in FIG. 5 an elongated bar-like member 222 is rockably pivoted at its opposite bent over ends 224—224' to respective actuating arms 226— 226', press-fitted on the hubs 228, FIG. 6, of pinion gears 230 rotatably mounted on the main drive shaft 80. Pinions 230 are in mesh with the large gear wheels 114 on rock shaft 16, hereinbefore described. Projecting from the member 222 at spaced intervals are a plurality of indexing finger-like extensions or projections 232, one for each backup gear wheel 192. Projections 232 are urged by a spring 225 in a direction to engage the teeth of the wheels 192. Referring particularly to FIG. 13 it is seen that each of the backup gears 192 is provided with twenty peripheral tooth-like projections 234, two of which, as indicated at 236 are formed by enlarged notches and are disposed 180° apart and may be employed as the zero and ten notch respectively.

As seen in FIGS. 13–17 inclusive, the projections 232 are offset as by being bent away from each other and from the plane of the member 222 by differing degrees (FIG. 13). In this manner the finger 232 associated with the units wheel 142 is obliged to seat in the large notch 236 before the finger 232 associated with the tens wheel 192 can engage the teeth thereof, and so on, with the hundreds and thousands wheels. This construction permits each finger 232 to be engageable with the teeth of its respective gear wheel only if the preceding adjacent finger, to the left in FIG. 5 (to the right in FIGS. 14–17), is engaged in the large notch 236 of its respective gear wheel 192. Thus the first or units gear wheel must be rotated to a position in which the finger 232a can be received within its large notch before the second gear wheel can be indexed one tooth, while the second gear wheel must be similarly rotated to a position to receive finger 232b in its large notch before the third wheel indexes one tooth and so on for each of the gear wheels.

A camming finger 233 substantially identical to the other finger projections is disposed intermediate the ends of the member 222 as shown in FIG. 5. A cam member 235, secured as by bolts, to the member 112 projects away therefrom to the right in FIG. 13, and is engageable with the finger 233. After each cycle of operation of the apparatus the member 222 is rocked as earlier described herein, leftwardly, FIG. 13, whereupon the finger 233 engages the cam member 235 causing the latter finger to ride up on the cam 235 and retract all of the fingers out of the path of movement of their respective wheels 192.

Figure 14:
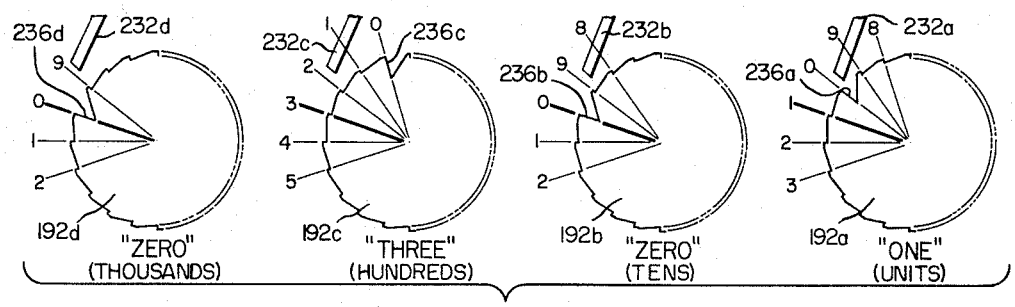

For a description of a typical reversing cycle of operation of the present apparatus reference is now made to FIGS. 14 through 17 inclusive, and first to FIG. 14. It is seen that the backup wheels of the apparatus which for the sake of clarity, are hereinafter designated 192a, b, c and d, are standing at positions indicated by the heavy black line, corresponding to the number 0301 previously indexed into the etched circuit members. Should the operator have inadvertantly or otherwise indexed this number in error when the correct number should have been 0299, then the following mode of operation may be effected to correct the error. The indexing fingers hereinafter designated 232a, b, c and d of the respective wheels are poised ready to be rocked by means of the camming mechanism 10 earlier described herein. The indexing finger 232a of the units wheel 192a is shown ready to engage its number "one" tooth in order to rotate this wheel counterclockwise i.e., backwardly, from its "one" position, indicated by the heavy black line, to the correct position.

Figure 15:
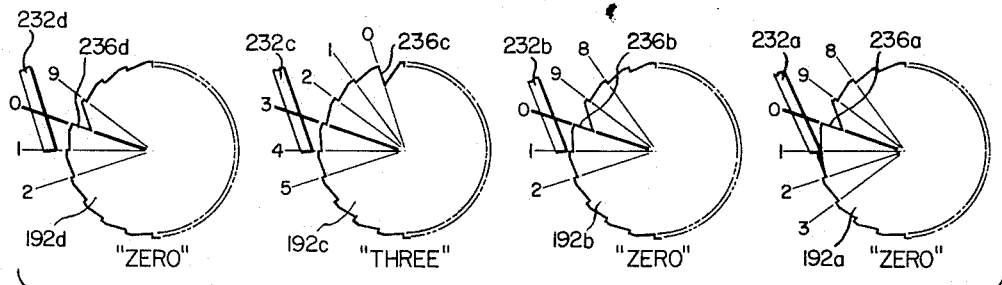
Figure 16:
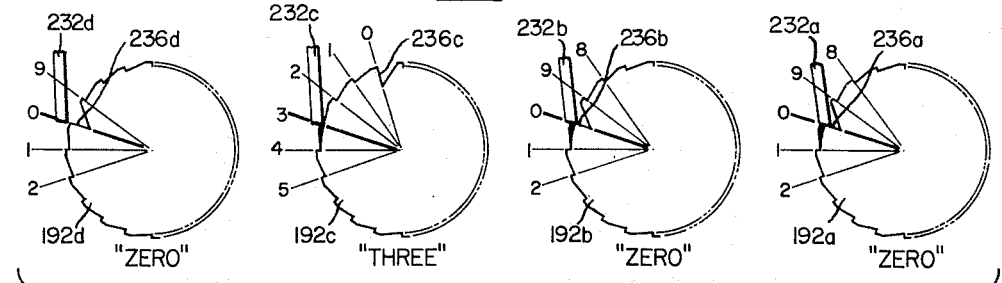
Figure 17:
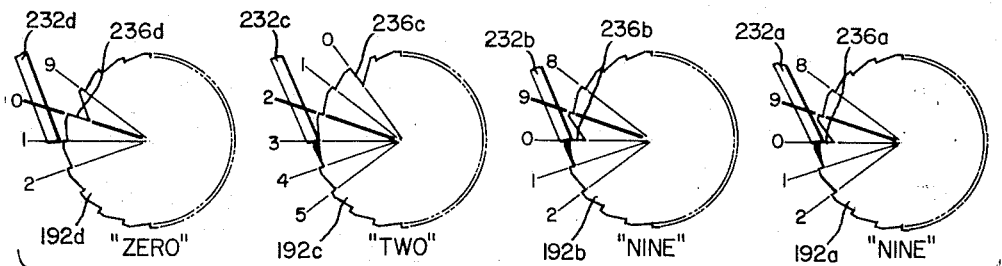

Energization of solenoid 56, FIGS. 1–4, cams arm 50 of the bell crank 36 into the path of travel of the continually rotating cam 84 whereupon one of the cam lobes 86 contacts follower 52 rocking the compound lever 12, rotating gears 114 and pinions 230, moving the indexing fingers 232a, b, c and d to the positions shown in FIG. 15. Wheel 192a, the units wheel, is thereby stepped counterclockwise from its "one" position to its "zero" position while the other fingers are arcuately indexed past the peripheries of their respective wheels without contact therewith. Thereafter the member 222 is returned to its initial or home position through gears 114—114' and mechanism 10 as earlier described herein. A second pulse applied to solenoid 56 rocks the indexing fingers, in the manner hereinbefore described, whereupon finger 232a engages the large notch 236a (FIG. 16) to cause the first wheel 192a to rotate to its "nine" position simultaneously permitting the finger 232b to engage the zero notch of wheel 192b to rotate the latter to its "nine" position. At the same time finger 232c is thus enabled to engage the three tooth of wheel 192c and rotate it one tooth counterclockwise to its "two" position while the fourth indexing finger 232d is arcuately moved past the periphery of wheel 192d without contacting the latter. This conjoint operation of the four indexing fingers permits each of the wheels to be stepped backwardly thus to reset the units, tens and hundreds wheels to the positions shown in FIG. 17, correcting the erroneously entered number 0301 to the correct number 0299.

The present invention provides a novel relatively simple and reliable intermittent motion apparatus for rotating a pivoted lever through a fixed angle on demand and has use, among other applications, in business machines, for example, wherein it is necessary or desirable to be able to correct numerical entries, as by subtracting erroneously added digits therefrom. The invention provides a novel construction which eliminates cam and follower wear by retracting the cam follower out of the path of movement of the cam after each actuation of the follower. A latching feature is incorporated in the apparatus so as to prevent over cycling thereof. The present invention permits the apparatus to perform in continuous single or mutliple cycles as desired.

What is claimed is:

1. Apparatus for moving a pivoted lever comprising, a rotatable cam, means for coupling said cam to a source of torque, a rockable member disposed adjacent said cam and operably engageable therewith, a pivotally mounted member disposed adjacent said rockable member, means for rocking said rockable member in one direction into the path of movement of said cam whereby said cam is effective to rock said rockable member in the opposite direction, and means for coupling said rockable member to said pivotally mounted member whereby the latter is rocked about its pivotal mounting during movement of said rockable member in the opposite direction.

2. Apparatus for moving a pivoted lever comprising, a rotatable cam, means for coupling said cam to a source of torque, a rockable bell crank disposed adjacent said cam and operably engageable therewith, a lever pivotally mounted adjacent said bell crank, means for rocking said bell crank in one direction into the path of movement of said cam whereby said cam is effective to rock said bell crank in the opposite direction, and means for coupling said bell crank to said lever whereby said lever is rocked about its pivotal mounting during movement of said bell crank in the opposite direction.

3. Intermittent motion apparatus comprising, a first rotatable shaft, a cam on said shaft, means for connecting said shaft to a source of torque, a rock shaft, a lever carried by said rock shaft, a bell crank pivotally mounted to said lever, means biasing said bell crank in a direction away from said cam, cam means operably associated with said lever and adapted when moved to latch said bell crank to said lever thereby urging said bell crank in a direction towards said cam for intermittent engagement therewith permitting said cam to rock said lever and said shaft, and, means to so move said cam means.

4. Apparatus for effecting intermittent rocking of a shaft comprising, a first member secured to said shaft, a second member, means mounting said second member adjacent to said first member for movement relative to said first member and between terminal retracted and advanced positions, a rotatable cam, electro-mechanical means for effecting movement of said second member from its retracted to its advanced position wherein a portion of said second member is in the path of rotation of said cam and whereby said second member is moved in the opposite direction by said cam when the cam is rotating, said electro-mechanical means being effective to lock said first and said second members for movement together in said opposite direction whereby said shaft is rocked during such opposite movement, means for releasably latching said members and said shaft in said rocked position, means for releasing said latch means, and means for returning said first and second members to their original positions.

5. Intermittent motion apparatus comprising, a rotatable shaft including means coupling said shaft to a source of constant torque, a plurality of electrically insulating members carrying electrical circuits thereon, switch means associated with said members for switching from one to another of said electrical circuits, an escapement mechanism including an electromagnet operably associated with the switch means of each of said members, clutch means drivingly connecting each said escapement mechanism to said rotatable shaft, means coupling said escapement mechanism to said switch means for incrementally driving said switch means through said clutch means in one direction in response to actuation of said escapement mechanism, a cam member carried by said rotatable shaft, and means engageable with said cam member and operable thereby to effect incremental movement of said switch means in the opposite direction.

6. Intermittent motion apparatus comprising, a first rotatable shaft, a cam on said shaft, means coupling said shaft to a source of torque, a rock shaft, a lever carried by said rock shaft, a bell crank pivotally mounted to said lever, means biasing said bell crank in a direction away from said cam, a cam follower slidably associated with said lever and adapted when moved in one direction to latch said bell crank to said lever thereby urging said bell crank in a direction towards said cam for momentary engagement therewith thus permitting said cam to rock said lever and said shaft, and, electromagnetic means to so move said follower.

7. Intermittent motion apparatus comprising, a rotatable shaft including means connectible to a source of torque, a cam rotatable with said shaft, a rock shaft adjacent said rotatable shaft, an elongated lever secured to and movable with said rock shaft, a cam follower mounted on said lever, a bell crank pivotally mounted to said shaft adjacent to said lever and having oppositely disposed arms one of which extends away from said lever, means on said one arm engageable with said cam, the other of said arms projecting substantially parallel to said lever and into operative engagement with said cam follower, and signal responsive means including an element normally engaging said cam follower and movable thereby in response to energization of said signal responsive means for urging said cam follower to move said other one of said arms away from said lever thereby to rock said bell crank about its pivotal mounting thus positioning said one of said arms into the path of movement of said cam thereby causing said cam to rock said lever in the opposite direction.

8. Intermittent motion apparatus comprising, a first rockable shaft, a lever secured to and movable with said shaft, said lever being provided with an elongated slot therein, an electromagnet including an armature, said armature having a bifurcated end portion adapted to straddle the end of said lever, a first cam follower slidable in said slot in said lever and engageable with the bifurcated end of said armature, a bell crank pivotally mounted on said lever, one arm of said bell crank carrying a second cam follower at the end thereof, the other arm of said bell crank normally extending substantially parallel to said lever and including a cam surface thereon slidably engageable by said first cam follower for rocking said bell crank away from said armature, a rotatable cam engageable by said second follower when said bell crank is rocked away from said armature, means for connecting said cam to a source of torque, and, means for connecting said electromagnet to a source of electrical energy for causing said armature to cam said first follower into engagement with said bell crank and move the latter into the path of movement of said constantly rotating cam whereby said cam is effective to rock said lever and said shaft.

9. A retractable single action cam mechanism comprising, a rotatable shaft, means coupling said shaft to a source of constant torque, a cam mounted on said shaft for rotative movement therewith, said cam being provided with oppositely disposed complementary cam lobes, a rockable shaft disposed adjacent to and parallel with said rotatable shaft, a lever secured to and movable with said rockable shaft, a V-shaped bell crank pivotally mounted on the end of said rockable shaft adjacent said lever and movable toward and away from said cam, one arm of said bell crank carrying a follower roller engageable with the lobes of said cam when said bell crank is rocked theretoward, the other arm of said bell crank being provided with a cam surface at one end thereof, means normally biasing said bell crank in a direction out of engagement with said cam lobes and into a position with said one arm parallel to the long dimension of said lever, an electromagnet having a pole piece and including a movable clapper normally biased out of engagement therewith, an actuator for said bell crank, said actuator normally engaging said clapper and being movable thereby to engage the cam of said one arm of said bell crank thus to rock said bell crank into the path of movement of the lobes of said cam, means biasing said actuator away from said one arm and toward said clapper, a latch for said lever, and, resilient means coupling said latch to said clapper for conjoint movement therewith in response to the energization of said electromagnet whereby said bell crank is held out of operative engagement with said cam lobes after each contact of a lobe with said one arm of said bell crank.

10. Intermittent motion apparatus comprising, a rotatable shaft including means coupling said shaft to a source of constant torque, a cam secured to said shaft and rotatable therewith, a rock shaft adjacent to and parallel with said rotatable shaft, a lever disposed on one end of said rock shaft and including a projecting tab extending away from the unsupported end thereof, said lever having a slot formed therein, a cam follower member slidably received in said slot, means urging said follower toward the unsupported end of said lever, a two armed crank pivotally mounted on said rock shaft for rocking movement relative to said lever, one arm of said crank extending toward the path of movement of said cam, the other arm of said crank normally urged into parallel relationship with said lever, said other arm of said crank including means engageable by said follower for displacing said one arm of said crank relative to said lever thus to rock said crank and move said other arm of said crank into engagement with said cam, an electromagnet, a signal responsive element operatively associated with said electromagnet and adapted upon energization thereof to move said follower into a position relative to said lever thus to lock said crank and said lever together whereby upon rotation of said cam said crank and said lever are rocked away from said cam, and, a latch for said lever, said latch being biased in a direction toward said signal responsive element and including means engageable with said tab for holding said lever and said bell crank out of the path of movement of said cam while said electromagnet is energized.

11. Intermittent motion switch control apparatus comprising, a rotatable shaft including means coupling said shaft to a source of constant torque, a plurality of electrically insulating members carrying electrical circuits thereon, switch means associated with said members for switching from one to another of said electrical circuits, an escapement mechanism including an electromagnet operably associated with the switch means of each of said members, clutch means drivingly connecting each said escapement mechanism to said rotatable shaft, means coupling said escapement mechanism to said switch means for incrementally driving said switch means through said clutch means in one direction in response to actuation of said escapement mechanism, a cam member carried by said rotatable shaft, a rock shaft adjacent to said rotatable shaft and including means drivingly engaging said rotatable shaft therewith for reversely driving said switch means, a bell crank operatively associated with said rock shaft for rocking the latter, means carried by said bell crank and engageable with said cam, and, signal responsive means engageable with said bell crank for moving said bell crank into the path of movement of said cam thereby to cause said cam to rock said rock shaft in the opposite direction to so reversely drive said switch means.

12. Automatic intermittent stepping apparatus comprising, a rotatable shaft, means coupling said rotatable shaft to a source of torque, a multi-lobed rotary cam secured to and movable with said shaft, a rock shaft adjacent said rotatable shaft, an elongated lever secured to said rock shaft and movable therewith, a bell crank pivotally mounted on said rock shaft for rocking movement thereabout, means biasing said bell crank into operative association with said elongated lever, said lever being provided with a longitudinal slot therein, a cylindrical cam follower slidable in said slot and normally urged outwardly therefrom, an electromagnet, a clapper operatively associated with said electromagnet and engageable with said cylindrical cam follower for moving the latter within said slot, means connecting said electromagnet to a source of electrical energy whereby actuation of said clapper in response to energization of said solenoid moves said follower to effect latching engagement of said bell crank and said lever enabling said rotatary cam lobes to rock said lever and said rock shaft, a stepping apparatus, means for stepping said apparatus incrementally in one direction, and means coupling said stepping apparatus with said rock shaft whereby the incremental movement of said stepping apparatus may be reversed.

References Cited in the file of this patent

UNITED STATES PATENTS

| | | |
|---|---|---|
| 2,845,804 | Lambert | Aug. 5, 1958 |
| 2,847,534 | Edgarton | Aug. 12, 1958 |
| 2,923,164 | Walsh | Feb. 2, 1960 |
| 2,931,871 | Dowds | Apr. 5, 1960 |